(12) United States Patent
Solmer

(10) Patent No.: US 8,539,000 B2
(45) Date of Patent: Sep. 17, 2013

(54) METHOD AND SYSTEM FOR INFORMATION MODELING AND APPLICATIONS THEREOF

(75) Inventor: Robert Solmer, San Diego, CA (US)

(73) Assignee: Textwise LLC, Rochester, NY (US)

( * ) Notice: Subject to any disclaimer, the term of this patent is extended or adjusted under 35 U.S.C. 154(b) by 88 days.

(21) Appl. No.: 13/044,806

(22) Filed: Mar. 10, 2011

(65) Prior Publication Data

US 2012/0233128 A1    Sep. 13, 2012

(51) Int. Cl.
*G06F 7/00* (2006.01)
*G06F 17/30* (2006.01)

(52) U.S. Cl.
CPC .... *G06F 17/30587* (2013.01); *G06F 17/30294* (2013.01); *G06F 17/30604* (2013.01)
USPC ............................ 707/803; 707/809; 707/810

(58) Field of Classification Search
CPC ................... G06F 17/30294; G06F 17/30587; G06F 17/30604
USPC ................................. 707/802, 803, 809, 810
See application file for complete search history.

(56) References Cited

U.S. PATENT DOCUMENTS

| | | | |
|---|---|---|---|
| 6,925,618 B1 * | 8/2005 | Teig et al. | 716/115 |
| 8,036,857 B2 * | 10/2011 | Potter et al. | 703/1 |
| 8,161,059 B2 * | 4/2012 | Guo et al. | 707/758 |
| 2002/0165717 A1 * | 11/2002 | Solmer et al. | 704/256 |
| 2007/0118498 A1 | 5/2007 | Song et al. | |
| 2008/0059187 A1 * | 3/2008 | Roitblat et al. | 704/257 |
| 2009/0055381 A1 | 2/2009 | Wu et al. | |
| 2009/0157572 A1 * | 6/2009 | Chidlovskii | 706/12 |
| 2009/0157585 A1 * | 6/2009 | Fu et al. | 706/46 |
| 2009/0271195 A1 * | 10/2009 | Kitade et al. | 704/239 |
| 2010/0100515 A1 * | 4/2010 | Bangalore et al. | 706/46 |
| 2010/0153318 A1 * | 6/2010 | Branavan et al. | 706/12 |
| 2010/0280985 A1 * | 11/2010 | Duchon et al. | 706/52 |
| 2011/0078159 A1 * | 3/2011 | Li et al. | 707/749 |
| 2011/0078206 A1 * | 3/2011 | Chen et al. | 707/797 |

OTHER PUBLICATIONS

International Search Report corresponding to PCT/US11/27891 dated May 3, 2011.

* cited by examiner

*Primary Examiner* — Phong Nguyen
(74) *Attorney, Agent, or Firm* — Dentons US LLP

(57) ABSTRACT

Method, system, and programs for an information model to be used in representing data. The information model includes a plurality of features, one or more information allocation models, and a configuration that associates an information allocation model with each of the features, where an information allocation model is to be used to allocate a portion of information contained in the data to each of the features and the total amount of information allocated to the features equals a total amount of information contained in the data.

23 Claims, 13 Drawing Sheets

Exemplary system diagram for generating/configuring the information model

Traditionally, data can be characterized by multiple sets of features.

Each traditional set can have multiple features, each of which may take one of multiple possible values.

Invention: information representation for data is constructed based on an information model as illustrated. Each I(x) is a function of the underlying data with respect to feature x.

Information model includes underlying features, corresponding available computational models (e.g., entropy), and configuration as to which computation model is used with respect to which underlying feature to compute information with respect to the underlying feature.

Exemplary system diagram for generating/configuring the information model

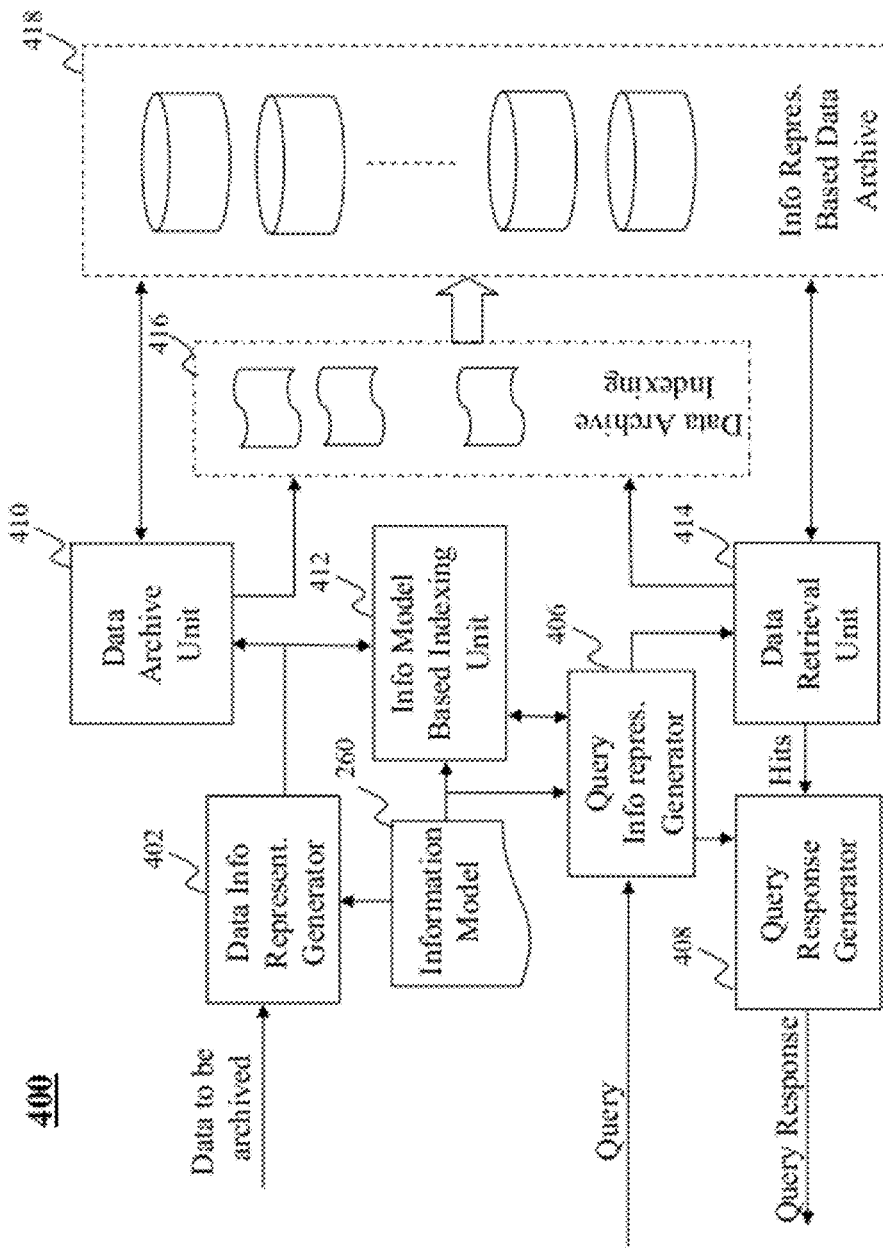
Fig. 4(a) Exemplary system diagram for usage of the information model based data representation/retrieval Internal system diagram for data/query data information representation generator Flowchart for data/query data information representation generator The environment in which the invention can be applied -- a different embodiment in which the inventory query engine is the backend of a search engine The environment in which the invention can be applied -- a different embodiment in which the inventory query engine is the backend of a search engine General computer architecture on which the invention can be implemented.

METHOD AND SYSTEM FOR INFORMATION MODELING AND APPLICATIONS THEREOF

BACKGROUND

1. Technical Field

The present teaching relates to methods, systems and programming for data processing. Particularly, the present teaching is directed to methods, systems, and programming for characterizing heterogeneous aspects of data and systems incorporating the same.

2. Discussion of Technical Background

The advancement in the world of the Internet has made it possible to make a tremendous amount of information accessible to users located anywhere in the world. With the explosion of information, new issues have arisen. First, faced with all the information available, how to efficiently and effectively identify data of interest poses a serious challenge. Much effort has been put into organizing the vast amount of information to facilitate the search for information in a more systematic manner. Along that line, different techniques have been developed to classify content into meaningful categories in order to facilitate subsequent searches or queries. Imposing organization and structure on content has made it possible to achieve more meaningful searches and promoted more targeted commercial activities. For example, categorizing a piece of content into a class with a designated topic or interest often greatly facilitates the selection of advertisement information that is more on the point and relevant.

To categorize data into appropriate categories requires that the data be represented in a way that it accurately characterizes the underlying data. In general, each piece of data can have properties that reflect the multi-faceted nature of the data. For example, an image can be characterized based on colors present in the image (e.g., bright red color), individual objects present in the image (e.g., Tiger Woods appearing in the image), or a central theme to be conveyed by the entire image (e.g., the golf tournament in England featuring Tiger Woods with a sunset background). It is clear that a data set can be characterized by heterogeneous sets of features, some highly semantic (e.g., the golf tournament scene) and some associated with non-semantic aspects of the data (e.g., bright red color in an image). Different aspects of a data set can be useful for different purposes. For instance, although the feature of bright red color does not seem to have any semantic meaning, it can be very descriptive when a user is searching for a sunset scene. In this case, the feature characterizing a data set (e.g., an image) such as a golf tournament scene is not that helpful. Fully describing different aspects of a data set is not an easy task.

Traditionally, various aspects of a data set can be characterized using heterogeneous sets of features, as shown in FIG. 1(a) (Prior Art), where data 125 can be characterized using feature set 1 110, feature set 2 115, feature set 3 120, . . . , feature set K 105. Each feature set can have more than one feature and each feature in any feature set can have different values. This is shown in FIG. 1(b) (Prior Art). For example, there are multiple feature sets in FIG. 1(b), feature set 1 155, feature set 2 160, feature set 3 165, . . . , feature set K 167. Feature set 1 155 has multiple features, e.g., $F_{11}, F_{12}, \ldots, F_{1,N1}$, and each feature can take one of multiple values. As illustrated, feature $F_{11}$ may take any value of a set of possible values for that feature, $[V_{11,1}, V_{11,2}, \ldots, V_{11,m11}]$. Different features often have inherently very different types of feature values. For instance, the color red can be represented using a color code (numerical) but an estimated theme of an image, e.g., "golf tournament in England" may be represented by a text string. Because of this, traditionally, different feature sets are processed differently. For example, to match a data set 1 with a data set 2, features for each may be extracted first. Such extracted features frequently fall within different feature sets and have different types of feature values. To determine whether data set 1 is similar to data set 2, conventionally, corresponding feature sets are compared. For example, the color feature of data set 1 is compared with the color feature of data set 2 to determine whether the two data sets are similar in color. To compare color codes, the underlying processing is likely directed to numerical processing. In addition, a feature characterizing the central theme of the data set 1 is compared with the corresponding feature of data set 2 to see if they have a similar underlying theme. To compare such a feature, the processing is likely directed to text processing, which may be very different from color processing. Therefore, to process data, often different algorithms and processing modules need to be developed in both extracting features from data and in matching data based on their features. Therefore, there is a need to develop a representation scheme that provides a uniform way to characterize different aspects of a data set so that processing associated with the data set, such as archiving or searching can be accordingly made more uniform.

SUMMARY

The teaching disclosed herein relate to methods, systems, and programming for content processing. More particularly, the present teaching relates to methods, systems, and programming for data representation, archiving, searching, and retrieval.

In one example, a method, implemented on a machine having at least one processor, storage, and a communication platform connected to a network for constructing an information model to be used to represent data, is described. According to the method, a plurality of feature sets is first determined as being appropriate for the data. For each of the feature sets, one or more features are also determined. A plurality of information allocation models are provided so that each of the features in each feature set can be configured to be associated with an information allocation model to be used to allocated a portion of the information contained in the data to that feature. An information model is formed based on the features from the plurality of feature sets as well as the configuration that associates the information allocation models to the features. The total amount of information allocated to the features equals a total amount of information contained in the data.

In another example, a method, implemented on a machine having at least one processor, storage, and a communication platform connected to a network, for archiving data based on an information model is described. Input data is first obtained via the communication platform. An information model is then accessed, which specifies a plurality of features, one or more information allocation models, and configurations associating the information allocation models to the features. The input data is then processed with respect to the plurality of features specified in the information model. Based on the information allocation models associated with the features, a portion of the information contained in the input data is allocated to each of the features is such a way that the total amount of information allocated to the features equals the total amount of information contained in the input data. The allocations of information to the features are then used to construct an information representation of the input data and the input data is then archived based on the information representation so derived.

In a different example, a method, implemented on a machine having at least one processor, storage, and a communication platform connected to a network, for information search and retrieval based on an information model is described. A query is first obtained via the communication platform. An information model is accessed which comprises a plurality of features, one or more information allocation models, and configurations associating the information allocation models to the features. The query is then processed with respect to the plurality of features specified by the information model. A portion of the information that the query contains is then allocated to each of the plurality of features based on the processed data and using an information allocation model associated with the feature, where the total amount of information allocated to the features equals a total amount of information contained in the query. An information representation of the query is then constructed based on the allocated information amount to each feature. An archive is then searched for similar archived data based on the information representation of the query. A query response is then selected from the similar archived data and is returned as a response to the query.

In a different example, an information model to be used in representing data is disclosed. An information model in includes a plurality of features and one or more information allocation models are specified in the information model. The information model also includes a configuration that associates an information allocation model with each of the features, where an information allocation model is to be used to allocate a portion of the information contained in the data to each of the features and the total amount of information allocated to the features equals a total amount of information contained in the data.

In another different example, a system for archiving data based on an information model is described. The data archiving system comprises a communication platform through which data is obtained, an information model accessing unit configured for accessing an information model comprising a plurality of features, one or more information allocation models, and configurations associating the information allocation models with the features. The system additionally includes a feature-specific processing unit configured for processing the data with respect to the plurality of features and an information allocation determiner configured for allocating a portion of the information that the data contains to each of the plurality of features based on the processed data, where the total amount of information allocated to the features equals a total amount of information contained in the data. Based on the information allocations, an information representation constructor is configured for constructing an information representation of the data based on the allocated information amount to each feature. To archive the data, a data archiving unit is configured for archiving the data based on the information representation of the data.

In a different example, a system for information search and retrieval based on an information model is disclosed. The system includes a communication platform configured for obtaining a query, an information model accessing unit configured for accessing an information model comprising a plurality of features, one or more information allocation models, and configurations associating the information allocation models to the features, a feature-specific processing unit configured for processing the query with respect to the plurality of features, an information allocation determiner configured for allocating a portion of the information that the query contains to each of the plurality of features based on the processed data, where the total amount of information allocated to the features equals a total amount of information contained in the data, a query information representation generator configured for constructing an information representation of the query based on the allocated information amount to each feature, a data retrieval unit configured for accessing an archive and searching for similar archived data based on the information representation of the query, and a query response generator configured for returning a query response selected from the similar archived data and returning the query response as a response to the query.

Other concepts relate to software for implementing information model based data representation, archiving, searching, and query. A software product, in accord with the concepts, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for constructing an information model to be used to represent data is disclosed, where when the information is read by the machine, it causes the machine to provide a plurality of feature sets appropriate for the data, each of which is associated with one or more features, provide one or more information allocation models, associate an information allocation model with each feature where the information allocation model associated with the feature is to be used to allocate a portion of the information contained in the data to the feature, and stores an information model that comprises the features of the plurality of feature sets and a configuration associating the information allocation models with the features, wherein the total amount of information allocated to the features equals a total amount of information contained in the data.

In a different example, a machine readable and non-transitory medium having information recorded thereon for archiving data based on an information model is disclosed, where when the information is read by the machine, it causes the machine to obtain data, access an information model comprising a plurality of features, one or more information allocation models, and configurations associating the information allocation models to the features, process the data with respect to the plurality of features, allocate, based on the information allocation models, a portion of information that the data contains to each of the plurality of features based on the processed data, where the total amount of information allocated to the features equals a total amount of information contained in the data, construct an information representation of the data based on the allocated information amount to each feature, and archive the data based on the information representation of the data.

In a different example, a machine readable and non-transitory medium having information recorded thereon for search and query based on an information model is disclosed, where when the information is read by the machine, it causes the machine to obtain a query via a communication platform, access an information model comprising a plurality of features, one or more information allocation models, and configurations associating the information allocation models to the features, process the query with respect to the plurality of features, allocate a portion of information that the query contains to each of the plurality of features based on the processed data, where the total amount of information allocated to the features equals a total amount of information contained in the data, construct an information representation of the query based on the allocated information amount to each feature, access an archive to search for similar archived data based on the information representation of the query, select a query response from the similar archived data, and return the query response as a response to the query.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4(a) depicts an exemplary system architecture in which the information model is used to represent data for data archiving and retrieval applications, according to an embodiment of the present teaching;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of an information model, its implementations, and applications incorporating the information model. The present teachings are described in connection with any application environment in which data, particularly textual data, have properties of different facets and conventionally have to be characterized in terms of heterogeneous sets of features. With the present teachings, such heterogeneous sets of features can be modeled in a coherent manner in terms of the amount of information that the underlying data generates with respect to each individual feature. With such a coherent and uniform representation of data, any subsequent processing in connection with the data, such as information retrieval for search or query, can be performed in a uniform and, hence, more efficient manner. The information model disclosed herein preserves the descriptive and representative power of the original heterogeneous feature sets yet makes the processing much more computationally efficient.

In the following disclosure, textual data is used for discussion and illustration of the information model and its applications. However, the information model described herein is not limited to such exemplary type of data. The information model, as disclosed below, can be applied to any data set that can be generated, theoretically, based on one or more underlying generative models. In the context of textual data, a large class of generative models may be used to model a document. Here, a document can be a piece of textual information, including an article, a web site, or a query.

An information model is herein denoted by I(x), where x is a feature contained in the information model, and I(x) is the probability that a document (a piece of text such as a web site or a query) produces a bit (in the information sense) of information about feature x. The feature x characterizes a particular aspect of the underlying data. For example, in the context of textual data, feature x can be a word, a phrase, a topic, or a particular textual style.

Figure 1A:
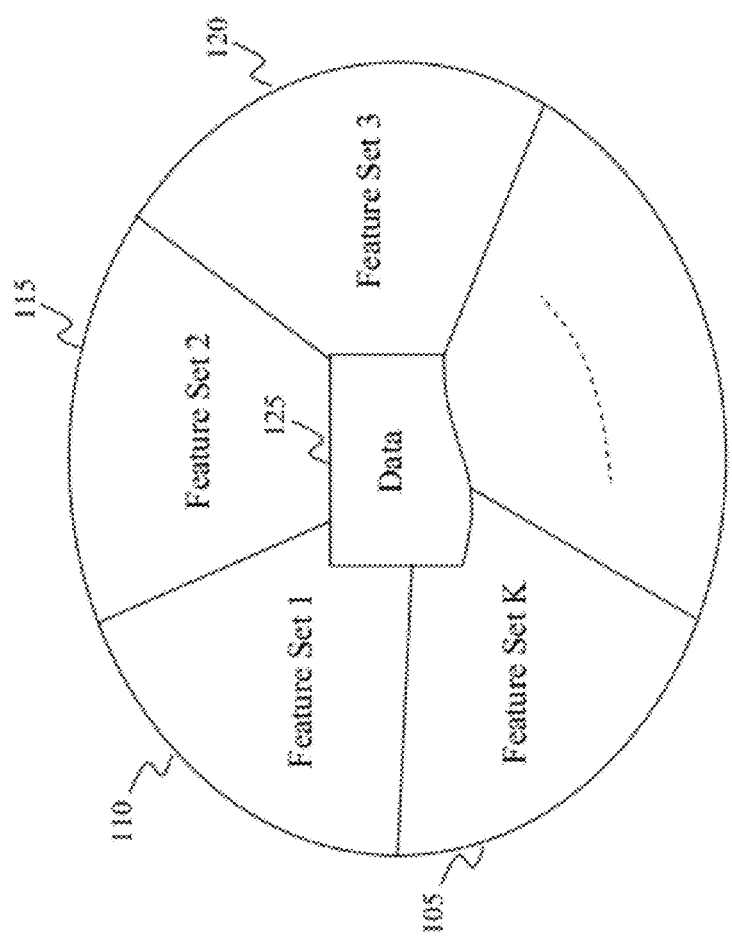
FIGS. 1(a) and 1(b) (Prior Art) describe a conventional approach, utilizing multiple features, to characterizing a data set.
Figure 1B:
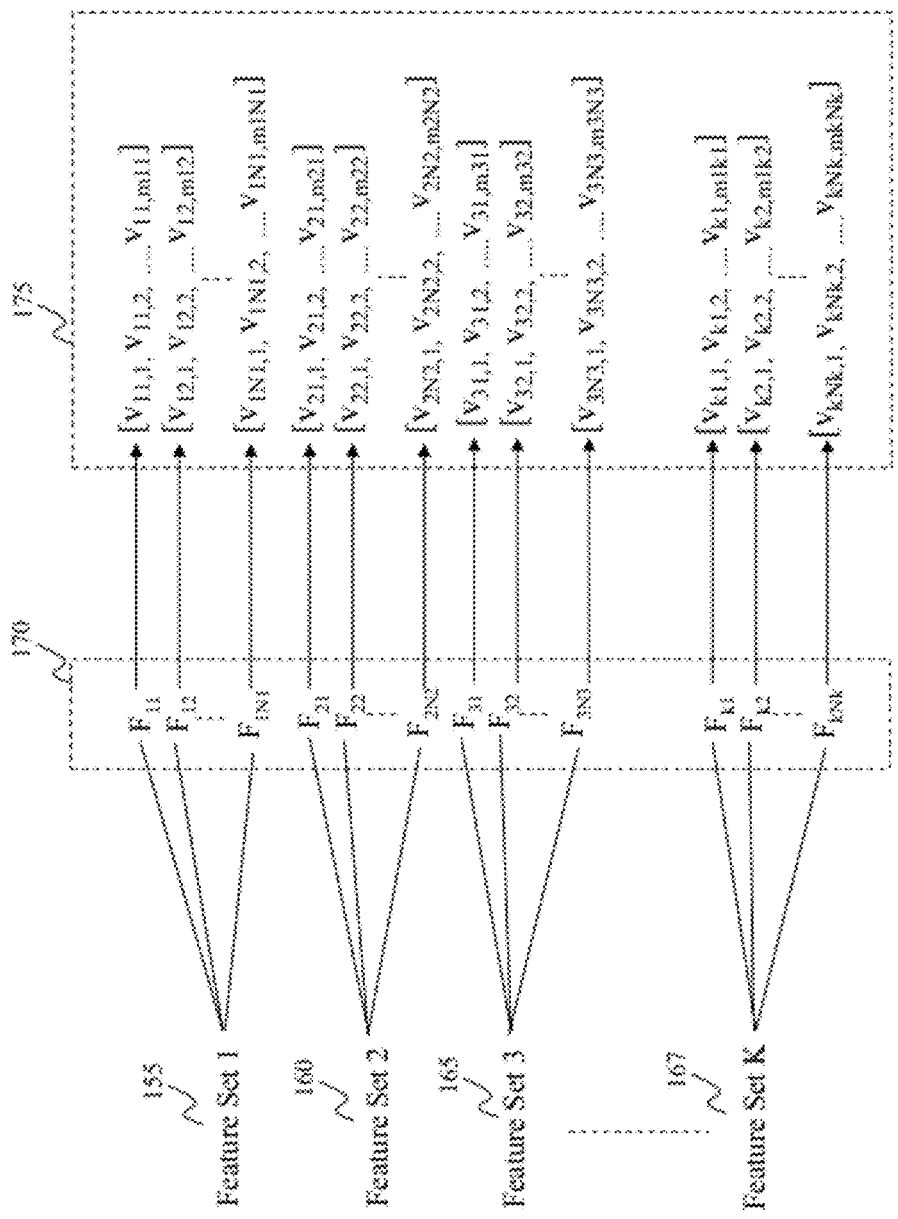
Figure 2A:
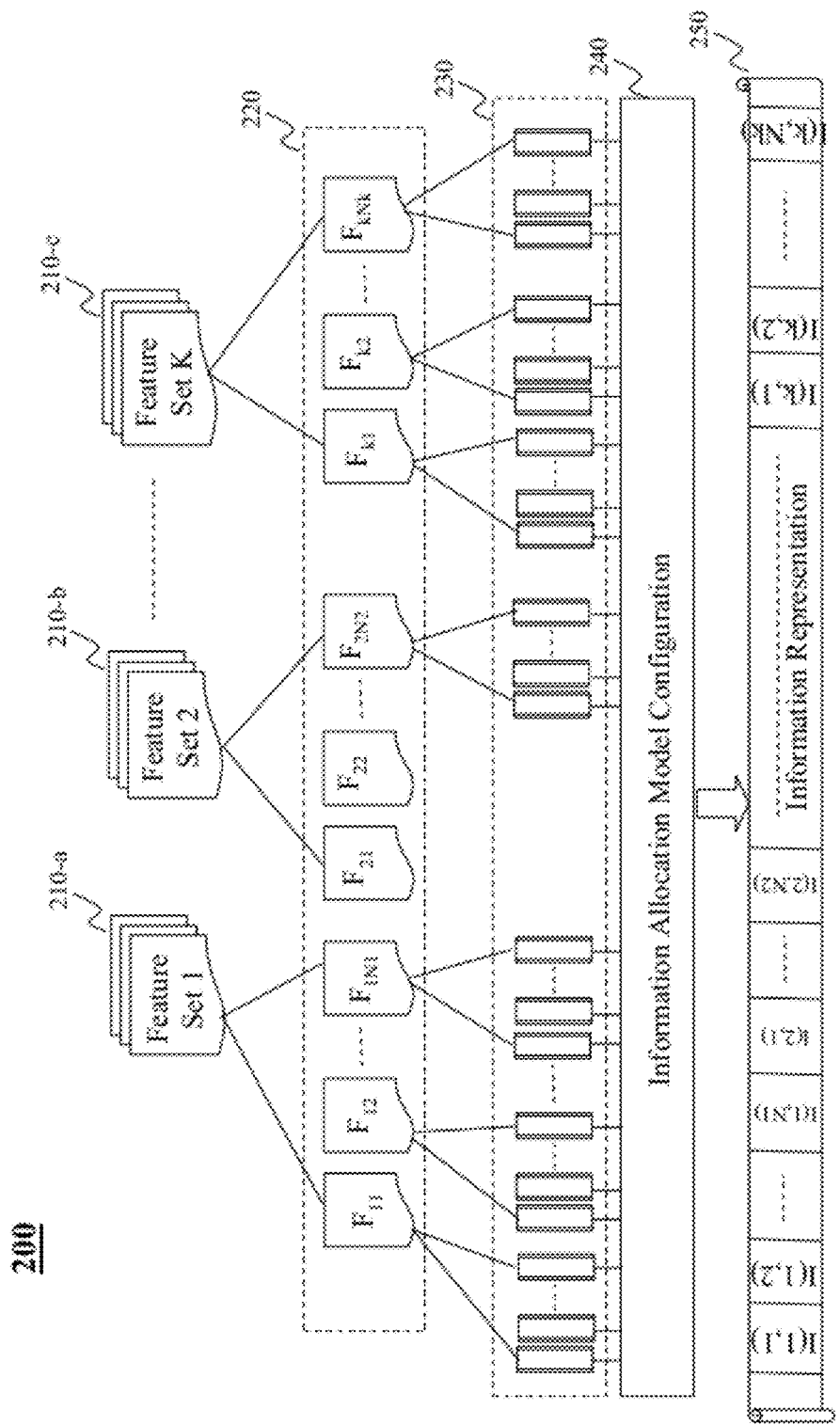
FIGS. 2(a) and 2(b) depict an overall data construct and layout of an information model to be used for characterizing a data set, according to an embodiment of the present teaching.

FIG. 2(a) depicts the construct of an information model I(x). There can be one or more feature sets, e.g., feature set 1 210-a, feature set 2 210-b, . . . and feature set K 210-c, that are used to characterize an underlying data set. Each feature set includes one or more features 220. For example, feature set 1 210-a includes features $F_{11}, F_{12}, \ldots, F_{1,N1}$ and feature set K 210-c includes features $F_{k1}, F_{k2}, \ldots, F_{k,Nk}$. The information model, as disclosed herein, is constructed with respect to each an every feature in all feature sets. As illustrated, in FIG. 2(a), for each feature $F_{ij}$, $1<i<k$, $1<j<N_k$, there is an I(i,j) FIG. 2(a) (250), computed to characterize the amount of information that the underlying data generates with respect to feature $F_{ij}$. The vector 250 composed of I(ij), $1<i<k$, $1<j<N_k$, characterizes the underlying data in terms of the proportion of information, as generated by the underlying data, that is allocated to each and every feature.

For example, assume a document can be characterized by feature sets of uni-gram, bi-gram, and topic. The uni-gram feature set may include all single words (features in this feature set) in the vocabulary as established based on, e.g., a corpus. Similarly, the bi-gram feature set may include all two word phrases in the phrase vocabulary established based on the same corpus. The topic feature set may include all possible topics across the documents in the corpus. With respect to such feature sets, a total amount of information (or entropy) associated with the underlying document may be computed, e.g., in the form of entropy computed based on known information theory. The information model as disclosed herein is used to allocate a proportion of the total amount of information associated with the document across all features to each and every specific feature. Typically, for most features, the proportion of the overall information contained in a document that can be attributed to each of them is extremely small or near zero. For example, if a corpus has a total of 500 topics (quite common), there will be 500 topic features, each of which is associated with one topic. Each document is usually classified as associating with only a few topics (e.g. 2-3). That is, the proportion of the information attributed to most of the topics is near zero or exactly zero. Thus, using the information model as illustrated in FIG. 2(a), features that are not important in describing a document can be effectively identified. This is especially useful when the dimensionality of the features used to characterize a document is high. In this manner, the information contained in such an information representation of a document can be effectively utilized to, e.g., significantly reduce the dimensionality of the features without much loss using, e.g., an autoencoder or any lossless dimensionality reduction mechanism.

To determine the fraction of the overall amount of information that the underlying data (e.g., a document) produces as attributable to each feature or I(i,j), the computation approach may be feature dependent. As shown in FIG. 2(a), various computational models 230 may be used for that purpose. In general, for each feature, there may be multiple computational models that can be used to determine the proportion of information attributed by that feature. For instance, for feature $F_{11}$, there are a plurality of computational models to be used to determine I(1,1). Which computational model is to be used in a specific application may be application dependent. In some situations, such a choice may also be data dependent. The choices for different features may be independent of each other. Thus, a computational model configured to compute the allocation for one feature may not be suitable for another feature. For instance, the computation model selected to allocate the information amount to a topic feature may not be the same model selected for allocating the information amount to a uni-gram feature.

Part of forming an information model is to configure the computational models to be used for each and very feature in order to allocate a portion of the overall information of a document with respect to such features. In FIG. 2(a), it is performed through the information allocation model configuration 240. Such a configuration may be made for each application and/or may be dynamically re-adjusted during the course of the application. In some embodiments, the dynamic adjustment may be made automatically based on, e.g., the observed performance of the system. For example, when degradation in performance is observed when a particular configuration is used, a different configuration may be used to substitute for (or in parallel with) the existing one if an improvement is observed. In some embodiments, a plurality of configurations may be executed in parallel and at any time instant, the one that yields the best performance may be selected. In some embodiments, the results produced by multiple configurations may be combined (either linearly or non-linearly) to produce an averaged performance to counter the possible degradation of any particular configuration.

The resultant vector I(i,j) or information representation 250 of the underlying data is typically a highly sparse vector, which not only represents the information distribution of the underlying data with respect to features but also provides a basis for lossless or lossy dimensionality reduction. With this information representation, it is more affordable to utilize features with very high dimensions in the early stage of the processing so that information across a wide range of different facets can be captured and yet still allow efficient subsequent data processing such as indexing, matching, and retrieval due to the dimensionality reduction.

Figure 2B:
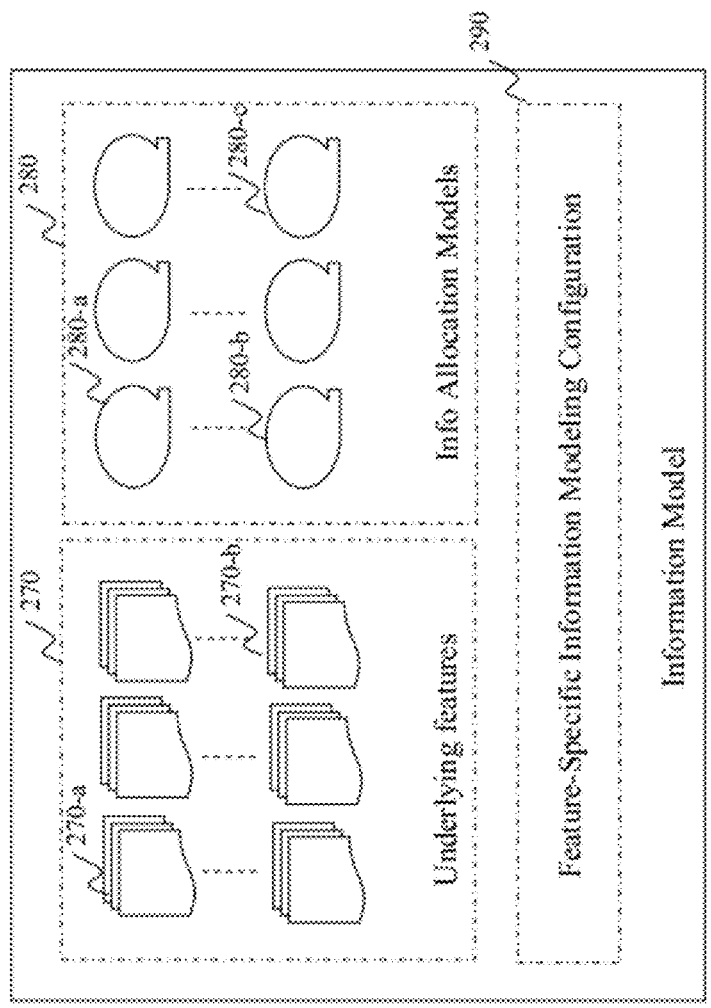

FIG. 2(b) depicts a layout of a generic information model 260 to be used for characterizing a data set, according to an embodiment of the present teaching. As discussed above, an information model 260 comprises a plurality of underlying features 270, one or more information allocation models 280 (280-a, . . . , 280-b, . . . , and 280-c), and feature-specific information modeling configuration 290 that configures computational models to be used to determine the allocation of information with respect to the features. The underlying features 270 may be logically related to one or more feature sets, 270-a, . . . , 270-b. Any instantiation of this generic information model (e.g., with a specific set of features and computational model as well as the configuration of which model is used for which feature to determine to allocation) is a specific information model which may be derived based on application needs or characteristics of the underlying data to which the information model is to be applied.

Figure 3:
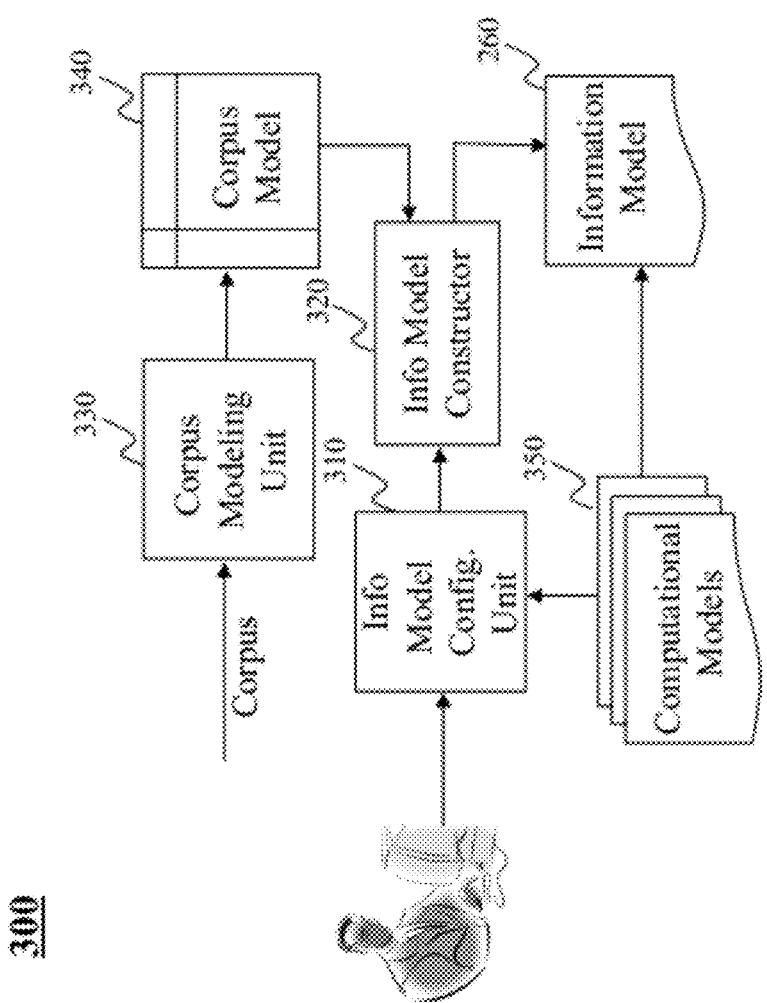
FIG. 3 depicts an exemplary construct of a system used to construct an information model, according to an embodiment of the present teaching.

FIG. 3 depicts an exemplary construct of a mechanism 300 used to form an information model, according to an embodiment of the present teaching. An information model constructor 320 combines information from a corpus model 340, an information model configuration unit 310, and the computational models 350, as depicted in FIG. 3, and produces an information model 260. The information received from the corpus model 340 may include the feature sets, which may be determined by a corpus modeling unit 330 based on an input corpus. The information received from the information model configuration unit 310 may include the specific configuration that associates each feature with a computational model to be used to compute the allocation of information with respect to that feature. The configuration generated by the information model configuration unit 310 may be derived based on interactions with a human operator who configures the information model 260 based on considerations, including the nature of the underlying data, the characteristics of the application, the availability of the computational models 350, and/or knowledge of different computational models, etc. Information related to the computational models 350 may also be directly included in the information model so that future adjustment in the configuration may be dynamically made.

As discussed above, such generated information model leads to a better weighting of features. That is, through allocation of the proportion of the information to each feature, features that have a low information allocation will be considered not important or non-representative of the underlying data. Such an identification of non-representative features of a document can be significant in many applications. For example, in processing a query, it is highly important that a search engine can quickly identify data in an archive that is considered relevant to the query. For example, if there are 500 topics in the feature space and one particular document is considered relevant only to topics "health", "medicine", and "drugs", then the fact that a query that is characterized as related only to "politics" will allow a quick conclusion that the particular document is not relevant with respect to topics.

The effectiveness of the information model is even more evident when a document is characterized by multiple feature types, which is the case most of the time. For example, if an information model includes, among other features, topic features "computers" and "food" and unigram features "apple" and "sun." In generating an information representation based on such a model, weights assigned to those features represent the respective proportions of the overall information arising from an underlying document that can be attributed to the respective features. Based on such weights, one can make a finer level of distinction as to relevant documents. For instance, a document about Apple computers, in which the unigram feature "apple" and the topic "computers" have high weights, can be distinguished from a document about Sun computers, in which the unigram feature "sun" and the topic feature "computers" have high weights. In addition, a document comparing Apple and Sun computers, with high weights for unigram features "apple" and "sun" and for topic feature "computers," can be distinguished from a document describing how to dry apples in the sun, which may have high weights for the unigrams "apple" and "sun," but a low weight for the topic "computers."

The discussion below is directed to different exemplary embodiments of computational models for information allocation that attribute a portion of the overall information contained in a document to specific features. First, an exemplary computational model for information allocation with respect to a unigram feature is presented. The unigram model is frequently used in classical language models to characterize a document for, e.g., information retrieval. Under this model, each word in a vocabulary (e.g., derived based on a corpus) is a feature.

Each unigram feature is a word or term in a corpus. To allocate information to unigram features, present teaching creates a feature vector for each document in a corpus based on, e.g., probability distributions of the information associated with a term in a given document. The probability distributions may be created using the following procedure. First, the collection frequency and document frequency may be accumulated for each term over all documents in the corpus. In some embodiments, based on the collection and document frequencies, a corpus language model p(w) (de facto p(w|C), where C denotes the corpus) can be generated based on a simple unigram model as follows:

$$p(w) = \frac{c(w)}{N} \quad (1)$$

where c(w) is the number of occurrences of the term w in the corpus C, N is the total number of occurrences of all terms in the corpus C.

In some embodiments, the corpus language model may also be generated as a smoothed version of the above based on an absolute discounting:

$$p(w) = \frac{c(w) - D}{N} + \frac{D \cdot V_1}{V_0} \quad (2)$$

In this smoothed corpus language model, c(w) is the number of occurrences of term w in the corpus, N is the total number of occurrences of all terms in the corpus, D is a discount constant, $V_1$ is the number of terms with at least one occurrence in the corpus, and $V_0$ is an estimate of the actual vocabulary of the corpus (usually larger than the observed vocabulary $V_1$). Although illustrated as such in the disclosure herein, this is merely an exemplary embodiment to achieve a smoothed corpus language model. Other unigram language models may also be used to derive the corpus language model, including the presently existing or any future developed approaches.

In some embodiments, the corpus language model may be applied to a set of held-out documents to measure the information associated with each term in the corpus. Specifically, as held-out data is observed, information inherent in one occurrence is represented as −log p(w). The corpus information distribution for term w with respect to the entire corpus may then be computed as follows:

$$i(w) = \frac{\sum_{d \text{ in } D} \sum_{w \text{ in } d} -\log p(w|d)}{\sum_{d \text{ in } D'} \sum_{w' \text{ in } d} -\log p(w'|d)} \quad (3)$$

where D is the set of documents containing term w, w' is a term occurring in any document in the entire corpus, and D' includes all the documents in the corpus. When the corpus language model p(w) and corpus information distribution i(w) (or I(ij) corresponding to Fi,j, a feature in a unigram feature set) for all terms are computed, the information representation (vector 250) for each document from a plurality of documents can be computed as follows:

$$i(w|d) = \frac{\sum_{w \text{ in } d} -\log p(w|d)}{\sum_{w' \text{ in } d} -\log p(w'|d)} \quad (4)$$

In some embodiments, the probability p(w|d) may be estimated based on the corpus language model, p(w|C). In some embodiments, the information allocated to each term (feature) in a document may weighted based on some bias. For example, the information allocation with respect to a feature (word) may be based on the position of the term in the document. In general, a weight imposed on the allocated information with respect to a feature can be characterized as a function g(k), where k is the number of terms observed in the document prior to the currently observed term. If such a weighting scheme is utilized, the corpus information distribution is computed by:

$$i(w) = \frac{\sum_{d \text{ in } D} \sum_{k \text{ in } d, w_k = w} -g(k) \log p(w|d)}{\sum_{d \text{ in } D'} \sum_{k \text{ in } d} -g(k) \log p(w_k|d)} \quad (5)$$

Based on this corpus information distribution, the information representation for the document (i.e., vector 250) can be computed accordingly.

In some embodiments, a document may be divided into different and separate fields and weights may be estimated based on the field in which the term is observed. Examples of fields include title, abstract, subtitle, and body. Weights associated with each distinct field may be determined according to the estimated importance of such fields. For instance, for fields that are considered more important, a larger weight may be used to weigh the information allocation to a particular feature that is associated with such fields. In some embodiments, additional stylistic factors may also influence the weights. A document may have formatting information included therein to indicate the importance of the words as they occur. For example, information may be present indicating emphasized word with, e.g., boldface or larger font. Such information may also be used to influence the weights to be imposed on associated terms in estimating the information allocation associated with different terms.

It is well known that the likelihood for a term to occur increases if the term has occurred previously in the same document. A corpus language model that takes this into account is usually considered a better model because it better models a document. In some embodiments, to compute the information allocation with respect to a term, the information representation of each document can be computed based on a so-called Dirichlet distribution as follows:

$$p(w|d) = \frac{n(w, d) + \mu \cdot p(w|C)}{\sum_{w' \text{ in } d} n(w', d) + \mu} \quad (6)$$

Where p(w|C) represents the corpus model, n(w, d) denotes the frequency of term w in document d, and μ represents a smoothing parameter that affects how much the document model relies on the corpus model versus the document counts. Such cache model probabilities can be used both in creating a corpus information allocation and in constructing an information allocation vector (250) with respect to each document in the corpus.

In some embodiments, a document cache model can be employed in which an information representation of a present document can be derived based on a linear interpolation of the underlying corpus language model and a maximum likelihood information allocation of the terms observed before a currently observed term in the present document.

Similarly to unigram modeling approach, bi-gram models are also frequently used in the art for language modeling. In general, each feature of a set of bi-gram feature set is a two-word phrase. To derive an information model based representation for a document that has bi-gram features, an exemplary computational model for that purpose is disclosed. To estimate an information allocation with respect to a bi-gram feature, the information model is extended to include bigrams. In a conventional n-gram language model, probabilities $p(w_i|w_{i-1})$ are computed and used to characterize a document. According to the present teaching, to compute the information attributed by a bi-gram feature to the overall information amount contained in a document, the bi-gram feature is decomposed into components and information allocation to each components are individually computed. For example, a bi-gram feature $(w_i, w_j)$ is decomposed into two independent unigrams, $w_i$ and $w_j$, and a bi-gram $(w_i, w_j)$. Information allocation to each of such components associated with a bi-gram feature is individually computed. That is, information allocations $p(w_i)$ for unigram $w_i$, $p(w_j)$ for $w_j$, and $p(w_iw_j)$ for bigram $(w_i, w_j)$ are all computed. In this manner, the information allocations to both the bi-gram feature as well as to its components are separate and distinct in the information representation of the document.

In some embodiments, with respect to a bigram language model, the information allocated to a term occurrence is based on, e.g., a smoothed bigram language model or $-\log p(w_i|w_{i-1})$. In accordance with some embodiments of the present teaching, the amount of information allocated to the component unigrams and the bi-gram feature can be computed as follows:

$$i(w_i) += -\log p(w_i|w_{i-1}) \quad (7)$$

$$i(w_{i-1}w_i) += -\log p(w_i|w_{i-1}) + \log p(w_i) \quad (8)$$

$$i(w_{i-1}) += \log p(w_i|w_{i-1}) - \log p(w_i) \quad (9)$$

Note here that the log-likelihood of the two terms, $w_i$ and $w_j$, that make up the bigram $(w_i, w_j)$ is accumulated for the bigram's weight in the allocation. In addition, the log-likelihood ratio is subtracted from the word that occurred previously, i.e., word $w_{i-1}$. In this way, the total amount of information allocated in the information model for a single term is still the negative log probability of the current term, according to the language model. It can be shown that the same amount of information is associated with each n-gram if the language model is inverted in such a way that the probability of a word depends on the subsequent occurrence of the word rather than the previous occurrence of the word.

Representing the information distribution (allocation) of a bi-gram feature based on information allocation to all of its components increases the dimensionality. In some embodiments, to maintain a reasonable dimensionality of an information model, a decision may be made as to selecting which bi-gram features are to be stored. The criteria of such selections may be based on various metrics that indicate the significance of the bi-gram features. Examples of such metrics include mutual information (MI), log likelihood ratio, and residual inverse document frequency (IDF).

As well-known in the art of document processing, n-gram models are frequently used to characterize a document. N-gram models produce a set of overlapping {1 . . . N} n-grams as features, each of which has an appropriate weight based on the mutual information of successively larger n-grams. Although n-gram models have often been used in conventional approaches to language modeling for information retrieval, they have various drawbacks. For instance, with n-gram models, a very large model must be stored for each document. Consequently, the computation to measure the relevance between one document and another is thus very expensive. As discussed above, with the information model framework disclosed herein, less relevant or irrelevant features identified through the amount of information allocated to such features (near zero or zero) can be easily identified and only the most informative features associated with the document and/or query can be further considered.

The information allocation approach as described above for bi-gram features can be, in principle, extended to n-gram features, where n>2. An information representation (vector 250) for each document created according to the above exemplary computational models usually contains features which are not particularly representative of the content of the document. In some embodiments, the information allocation established based on a corpus language model can be separated from the informational allocation computed based on a specific document. This can be achieved iteratively based on, e.g., Expectation Maximization (EM) algorithm, as follows:

$$E\text{-step: } e_w = p(w|D) \cdot \frac{\hat{p}(w|D)}{(1-\lambda)p(w|C) + \lambda\hat{p}(w|D)} \quad (10)$$

$$M\text{-step: } \hat{p}(w|D) = \frac{e_w}{\sum_\tau e_\tau}, \text{ i.e., normalize the model} \quad (11)$$

In this iterative computation, the mixture parameter λ may be adjusted to make the adjusted document models $\hat{p}(w|D)$ more or less compact. As λ is adjusted down (decreased in value), it will cause the corresponding document model shifting its probability mass to fewer and fewer words. This process obviates the need for basing the computation on a stopwords list. In addition, it also tends to remove features from the document model that are not strongly associated with the document.

Another type of feature frequently used in document processing is features related to topics. A generative topic model can be employed to improve document modeling. Given a generative topic model, topics themselves serve as features. That is, a generative topic model may give rise to a set of topics, each of which corresponds to a particular feature. With respect to a topic feature, a computational model for computing information allocation with respect to the particular topic feature can also be developed. To model a document, a generative topic model may be employed to improve language modeling. Examples of such generative models include a mixture model, Latent Dirichlet Allocation model, Correlated Topic Model, and Pachinko Allocation Model, among others. In their most general form, such models represent the probability of generating a word was:

$$p(w|d) = \sum_i \left( p(w|z_i^0) \sum_j \left( p(z_i^0|z_j^1) \sum_k p(z_j^1|z_k^2) \cdot \ldots \cdot p(z_x^N|d) \right) \right) \quad (12)$$

The model includes a topic hierarchy comprising a plurality of topics at different levels, e.g., $Z^N$ at the highest level and $Z^0$ at the lowest level (often at word level). To generate a document, the generative process can be described as a process in which a high level topic $z_k^N$ from the topic hierarchy is first generated from the topic mixture $Z^N$, then a lower level topic is generated based on a different probability according to the model, until finally generating each word according to the lowest-level model $z_k^o$. The probability of generating a word is the weighted sum over all the possible topic choices.

In some embodiments, a topic model may have only the lowest level. The means of determining the probability $p(z_j^0)$ is dependent on the choice of a topic model. In general, there may be a combination of corpus-level estimation of data, followed by a modification of probabilities based on terms seen in the present document. It can be approximated that given a sequence of words W and a topic model Z, the probability of a term depends on the topic generated at the current position. That is, the current term w at position k is conditionally independent of W given $z_k$. Further, it is assumed that exactly one topic at each level of the topic hierarchy is generated at each position, i.e., exactly one topic chain is responsible for generating each word in the sequence W (formally, $p(z_i^k|w)=1$ when $z^k=z_i^k$, and is 0 otherwise). But, this actual generated topic is hidden.

In some embodiments, a topic model may be trained based on a corpus using a method called probabilistic Latent Semantic Indexing (pLSI), which will yield a set of topic models, collectively denoted as $p(w|Z)$. With a set of topic models, while a document is processed, the probability with respect to each topic or $p(z|d)$ can be updated after observing each word in the document. The update to the probability associated with each topic can be made after observing a word sequence $W=w_1 \ldots W_k$ based on, e.g., Bayes' rule, as follows:

$$p(z_i|W) = \frac{p(W|z_i)p(z_i)}{\sum_j p(W|z_j)p(z_j)} \quad (13)$$

where the $p(z_i)$ corresponds to the prior probabilities of the underlying topics as determined from the corpus. With respect to each word occurrence, the information allocated to the term can be computed as follows:

$$i(w_i) += -\log p(w_i|W) \text{ where} \quad (14)$$

$$p(w_i|W) = \sum_k p(w_i|z_k)p(z_k|W) \quad (15)$$

and $p(z_k|W)$ is defined in equation (13). With respect to information allocated to the topic, the actual topic generated by the model is an unknown hidden variable. Instead, the probabilities that the topic used to generate word w is topic z can be computed by the following equation:

$$p(z|w, W) = \frac{p(w|z)p(z|W)}{\sum_k p(w|z_k)p(z_k|W)} \quad (16)$$

Then the mutual information between each topic $z_k$ and a word w is computed as:

$$MI(z_k, w|W) = \log\frac{p(z_k, w|W)}{p(z_k|W)p(w|W)} = \log\frac{p(z_k|w, W)}{p(z_k|W)} \quad (17)$$

Given this, the mutual information between the hidden topic z and the observed word w can be estimated as a weighted average:

$$MI(z, w|W) = \sum_k p(z_k|w, W) \log\frac{p(z_k|w, W)}{p(z_k|W)} \quad (18)$$

This value can be subtracted from the information allocated to term w, and added proportionally to the information allocated to each topic:

$$i(w_i) -= \sum_k p(z_k|w, W) \log\frac{p(z_k|w, W)}{p(z_k|W)} \quad (19)$$

$$i(z_k) += p(z_k|w, W) \log\frac{p(z_k|w, W)}{p(z_k|W)} \quad (20)$$

This is analogous to what is disclosed above with respect to bigram features. That is, initially all the information may be attributed to an observed term. Then, information is re-allocated to topics according to the mutual information between the bi-gram feature (e.g., a two-word phrase) and the topic as well as the likelihood of the topic being the hidden generated topic for that bi-gram feature. Finally, the topic-feature and word-features can be combined together into one feature vector, and the information sums are normalized to produce the topic information allocation.

As mentioned above, the amount of information associated with a feature may be different depending on, e.g., other occurrences of the same feature in the data, either occurring previously or afterwards. This can be modeled based on adaptive/cache models. In general, adaptive/caching models do not introduce new features because a change in probability of a feature depends only on the feature itself. In some embodiments, a cache model and topic model can be combined in such a way that the probability $p(w|z)$ is instead replaced by the following:

$$p'(w|z) = \frac{\sum_{occurs(w \text{ in } d)} p_D(z|w) + \mu \cdot p(w|z)}{\sum_{w'} \sum_{occurs(w' \text{ in } d)} p_D(z|w') + \mu} \quad (21)$$

where again $\mu$ is a smoothing parameter that controls how much each topic model is adjusted to account for how bursty the word is within the document.

Although specific formulations are provided as exemplary computational models for information allocation with respect to different types of features (unigram, bi-gram, N-gram, topics, and adaptive/cache models), they are disclosed merely for illustration purposes. Any other approach to determine a portion of the overall information contained in a document as being attributed to a particular feature may be incorporated in the context of the information model disclosed herein and they are all within the scope of the present teaching. Below, specific applications in which the information models as disclosed herein can be applied and incorporated are described. They are also intended for illustration only and do not serve as limitations to the present teaching discussed herein.

FIG. 4(a) depicts an exemplary system architecture 400 in which the information model is used to represent data in data archiving and retrieval applications, according to an embodiment of the present teaching. In system 400, there are generally two directions of information flow. One is for representing and archiving input data based on the information model disclosed herein. The other is for searching and retrieving archived data based on the information model. As shown in FIG. 4(a), system 400 comprises an information representation based data archive 418, a data information representation generator 402, a data archive unit 410, a query information representation generator 406, a data retrieval unit 414, and a query response generator 408. Optionally, the system 400 may also comprise a data archive indexing mechanism 416, which indexes the data archived in the information representation based data archive 418 for subsequent retrieval. To facilitate that, the system 400 may also include an information model based indexing unit 412 which, based on the input data and its information representation created in accordance with the information model as disclosed herein, builds an index for the input data stored in the archive 418. For data retrieval based on index values, the data retrieval unit 414 is designed to be capable of interacting with the data archiving index mechanism 416 to utilize existing indices to facilitate speedy retrieval.

Upon receiving an input data, the data information representation generator 402 creates an information representation for the input data in accordance with the information model 260 as described herein. That is, the data information representation generator 402 generates an information representation 250 (a vector with each of its attributes representing the information allocated to the underlying feature). Such generated information representation is then forwarded to the data archive unit 410, which stores the data in the information representation based data archive 418 based on the corresponding information representation. Optionally, the stored input data may also be indexed, by the information model based indexing unit 412, based on it information representation. In some embodiments, prior to generating an index value, the information model based indexing unit 412 may also perform dimensionality reduction so that the index is established based on the most relevant features.

The archived data can be retrieved upon request for, e.g., searching or query purposes. Retrieval of data stored or indexed based on information representations (generated in accordance with the information model described herein) may be activated by a query. Upon receiving a query, the query information representation generator 406 analyzes the query and generates an information representation of the query in the manner as described herein. Such generated information representation for the query is then used to retrieve similar data in the archive 418. To do so, the data retrieval unit 414 interfaces with the archive 418 to search for one or more pieces of data that have information representations similar to that for the query. In some embodiments, based on the information representation for the query, the data retrieval unit 414 may first perform dimensionality reduction and then retrieve data based on a more condensed information representation. In some embodiments, the retrieval may be effectuated by utilizing an existing index via the data archive indexing mechanism 416.

In some embodiments, the information representation established in connection with a query may be generated based on the query itself. For example, a query may provide a document and requests to obtain a similar document. In this case, the search is for a document that may have, e.g., the same topic with the same discussion points. In some embodiments, the information representation established in connection with a query may also be generated based on a piece of text derived based on an analysis of the query (not shown). For instance, an analysis performed on query may indicate that the user who issues the query may be looking for information of a certain topic, even though the text of the query may not directly so state. In this case, the information representation is constructed based on a piece of text generated based on the query rather than based on the query itself. For example, a query may include only two keywords, e.g., "book fair", an analysis may yield the text "book fair in Rockville, Md." given that the system intelligently detects that the user issues the query in a locale closest to Rockville, Md. In this case, the information representation may be constructed based on "book fair in Rockville, Md." and such an information representation may then be used to look for archived information that relates to any book fair in the general area of Rockville, Md.

Once information is retrieved based on an information representation by the data retrieval unit 414, the query response generator 408 produces a response to the query in accordance with the retrieved information from the archive. In the case of a search query, information most similar to what is described in the query is returned as a response. In the case where the retrieval is obtained based on a text derived based on an analysis of the query, the response may be a piece of information considered to be what the user is asking for. Such generated query response is then returned to the user.

Figure 4B:
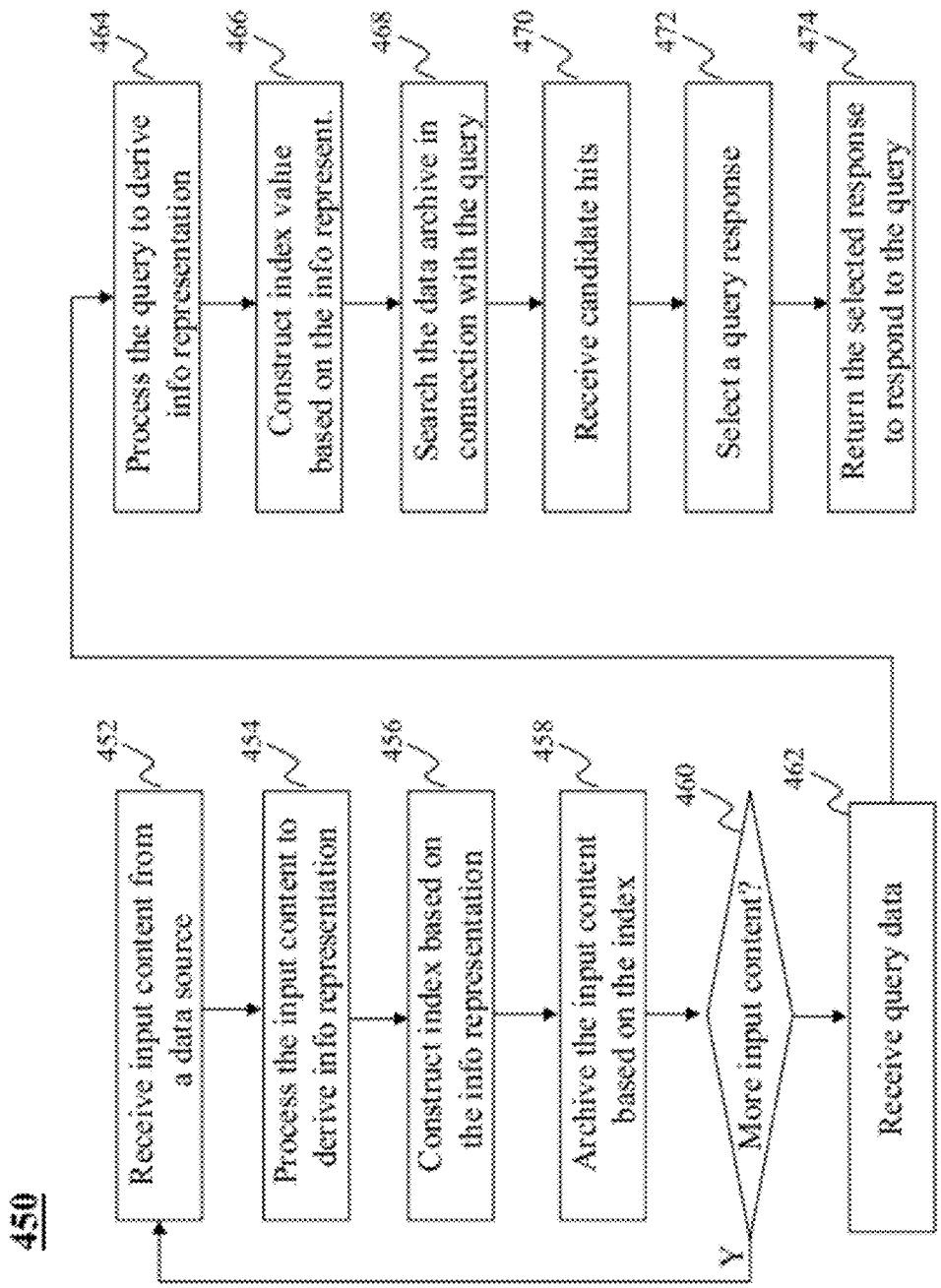
FIG. 4(b) is a flowchart of an exemplary process in which the information model is used to represent data for data archiving and retrieval applications, according to an embodiment of the present teaching.

FIG. 4(b) is a flowchart of an exemplary process in which the information model is used for data archiving and information search and retrieval, according to an embodiment of the present teaching. For data archiving, the input data is first received at 452. Such received input data is then analyzed, at 454, to generate an information representation of the input data. Optionally, an index for the input data can be constructed, at 456, based on the information representation of the input data before the input data is archived, at 458. This process repeats for each piece of input data in order to archive them in the information representation based data archive.

Upon receiving a query at 462, the query is processed to derive an information representation of the query. As discussed above, this can be either a representation of the query itself or a representation of some text generated based on an analysis of the query. Generation of an information representation for a query can be done in a similar manner as what is for the input data (except that the underlying data is different). With such generated information representation, an index can be optionally established, at 466, so that the retrieval can be achieved based on the index or efficient access. To retrieve what is queried, the archive is searched, at 468, based on the information representation in connection with the query. The search hits are then obtained at 470 and a query response is selected, at 472, based on the obtained search hits. Finally, the query response identified in this manner is returned, at 474, to the user as a response to the query.

Figure 5A:
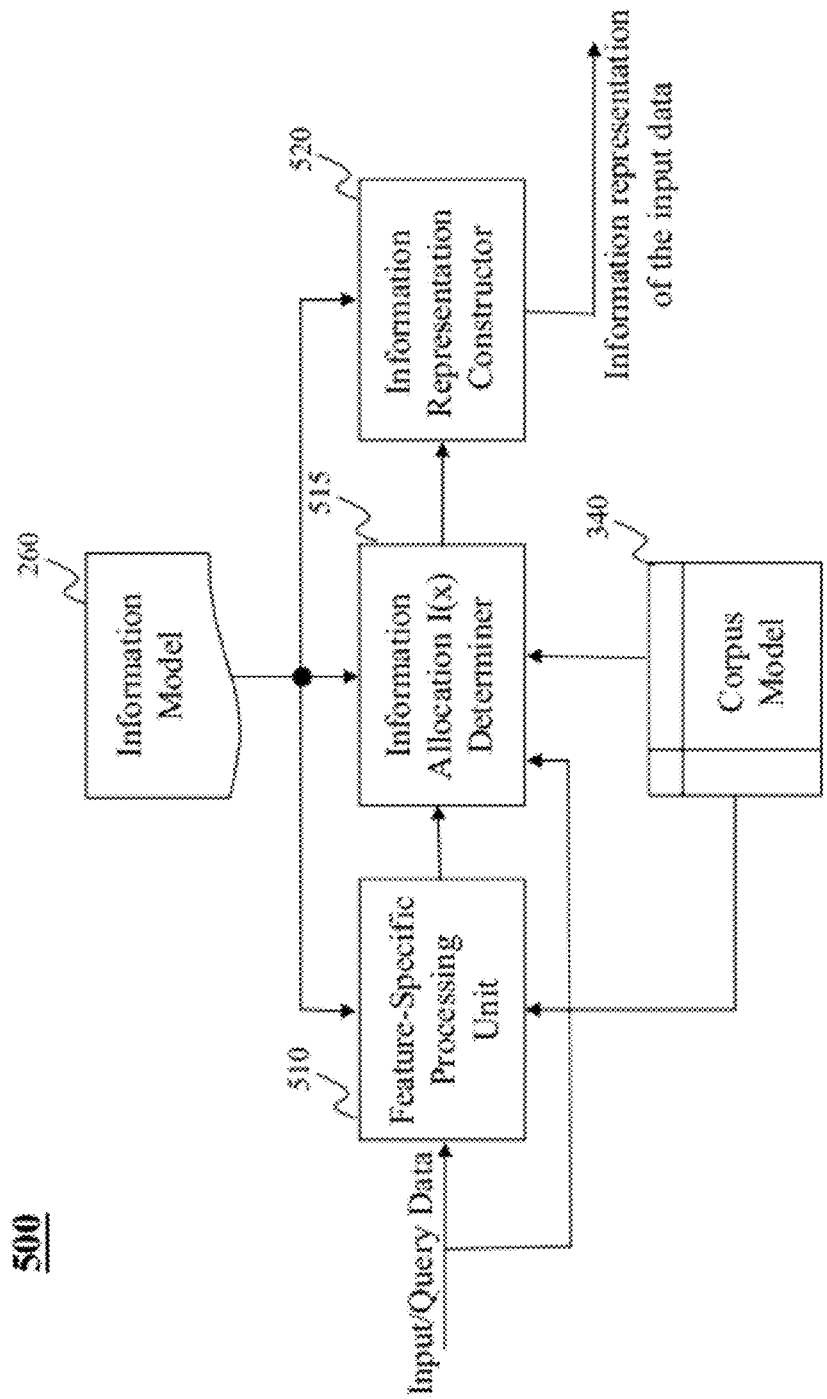
FIG. 5(a) depicts an exemplary system diagram for generating an information representation for data based on the information model, according to an embodiment of the present teaching.
Figure 5B:
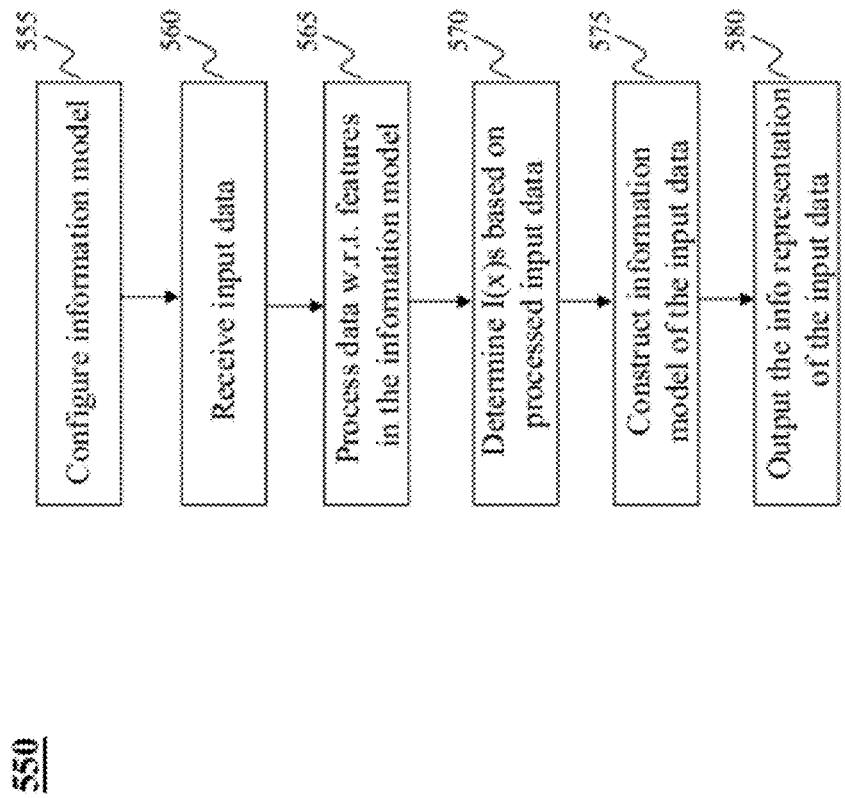
FIG. 5(b) is a flowchart of an exemplary process in which an information representation for data is generated based on the information model, according to an embodiment of the present teaching.

FIG. 5(*a*) depicts an exemplary system diagram 500 for generating an information representation based on the information model, according to an embodiment of the present teaching. As discussed above, an information representation can be generated for either input data (e.g., a document or a web site) or a query (e.g., a few keywords or a document). The exemplary system 500 as depicted in FIG. 5(*a*) can be used for either. Upon receiving an input (either input data or a query) for which information representation is to be generated, a feature-specific processing unit 510 processes the input based on, e.g., an information model 260 and a corpus model 340. For example, the feature-specific processing unit 510 may compute word count, frequencies, and probabilities (some illustrated in equations (1)-(21)) to be used for computing information allocation with respect to various features as determined by the corpus model. The feature-specific processing unit 510 then forwards such measures to an information allocation determiner 515, which will then compute information allocations with respect to different features in accordance with the information model 260 and the corpus model 340. The information allocation determiner subsequently sends such determined allocations of information with respect to different features to an information representation constructor 520 that assembles relevant information to form an information representation of the input information. In some embodiments, dimensionality reduction may be performed by the information representation constructor 520 so that the output information representation of the input has a dimension appropriate to the underlying input.

FIG. 5(*b*) is a flowchart of an exemplary process in which an information representation for input (data or query) is generated based on the information model, according to an embodiment of the present teaching. An information model is first configured at 555. When input is received at 560, it is processed, at 565, with respect to features specified by the information model. Such processing generates various measures such as counts, frequencies, and probabilities, in connection with various features and to be used in determining, at 570, information amount to be allocated to individual features. Based on the information allocation so determined, an information representation is constructed, at 575, and output at 580.

Figure 6A:
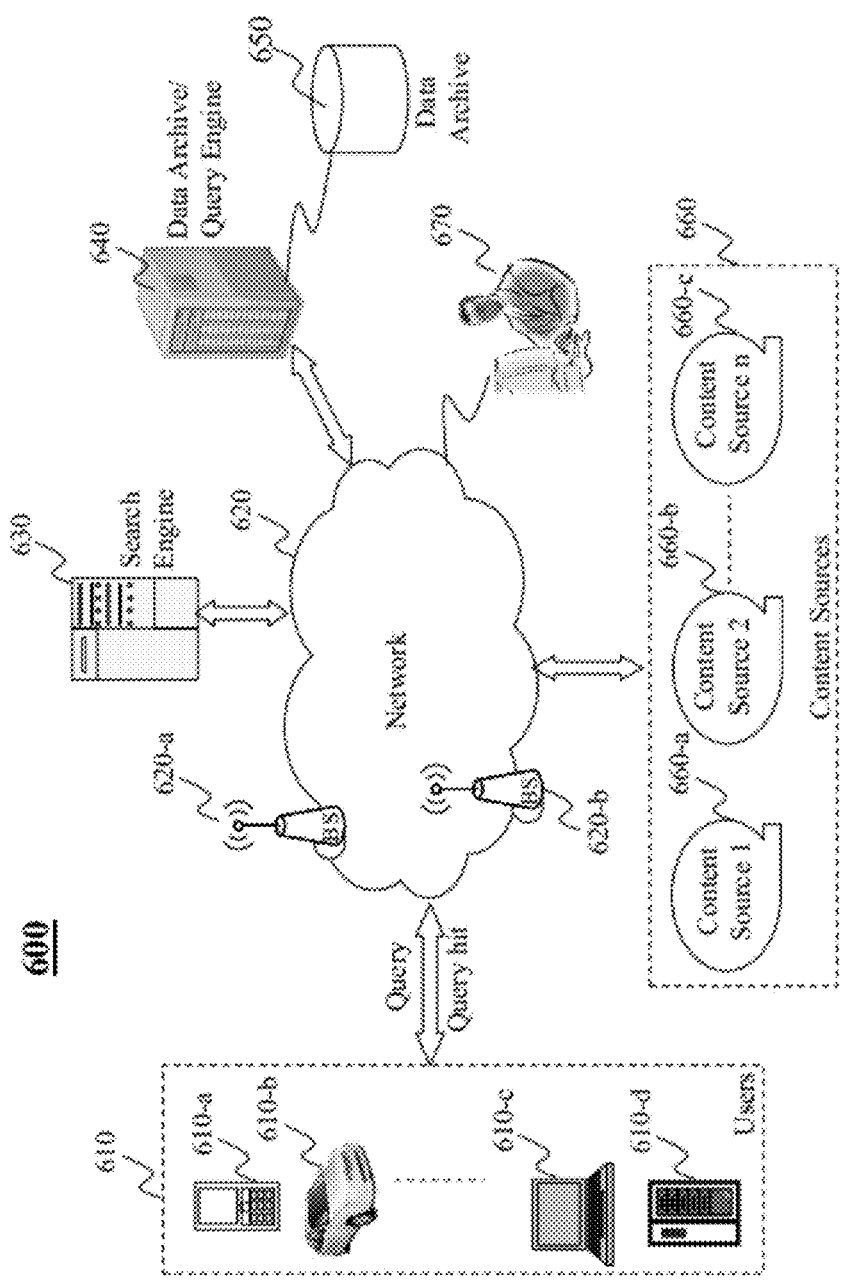
FIGS. 6(a)-6(c) depict exemplary overall system architectures for data archiving/retrieval in different applications based on an information model, according to different embodiments of the present teaching.
Figure 6B:
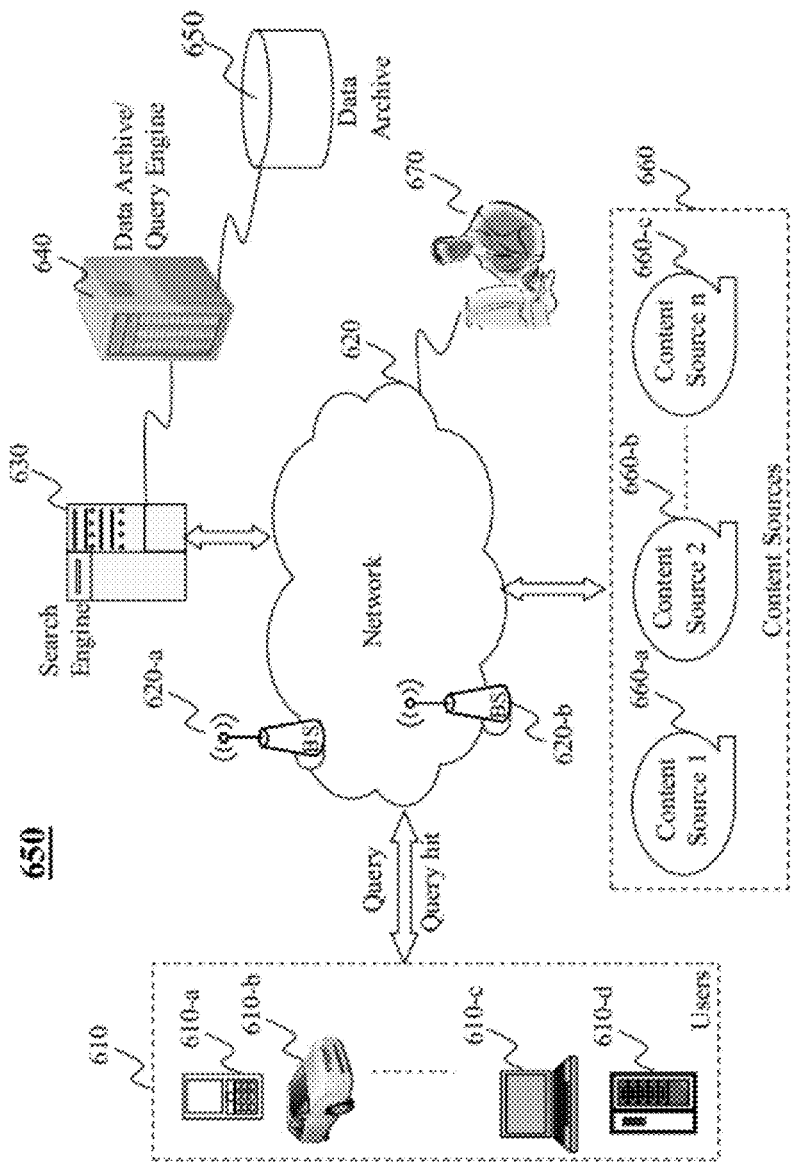
Figure 6C:
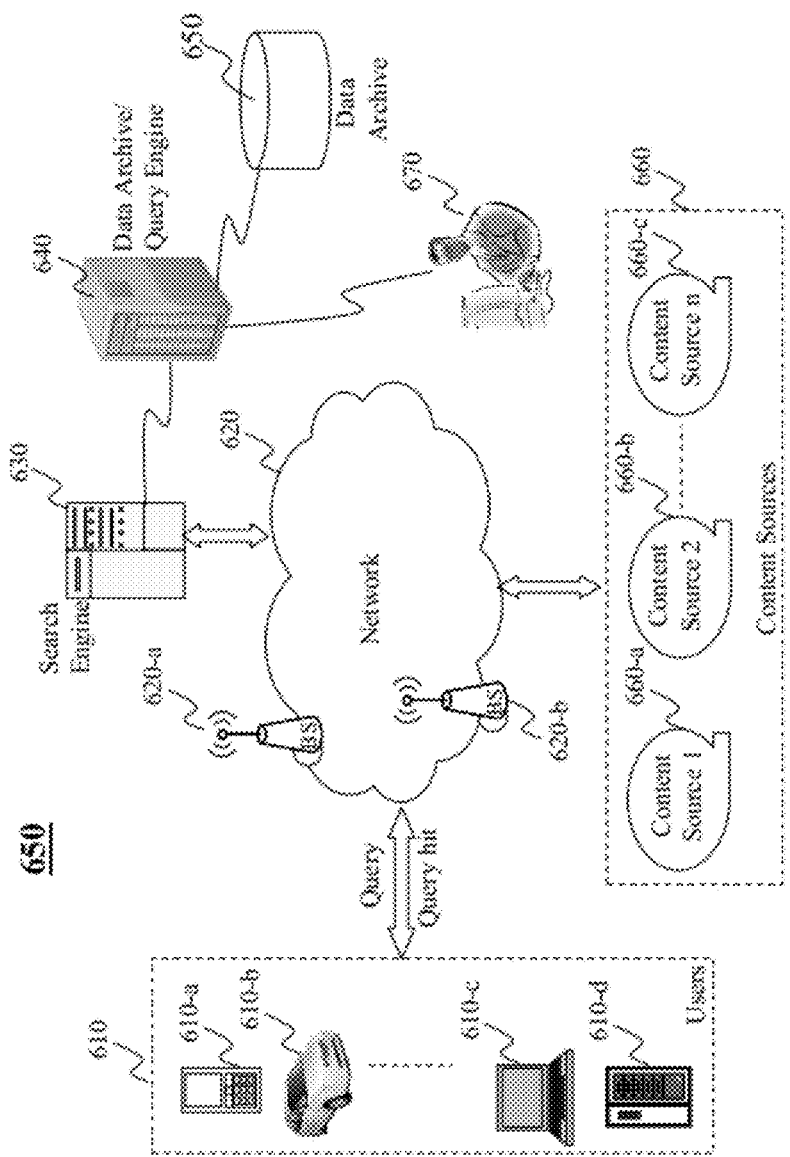

FIGS. 6(*a*)-6(*c* depict high level exemplary overall system architectures in which information model based data archiving/retrieval is deployed to facilitate efficient data processing, according to different embodiments of the present teaching. In FIG. 6(*a*), the exemplary system 600 includes user 610, a network 620, a search engine 630, data sources 660 including heterogeneous data source 1 660-*a*, data source 2 660-*b*, . . . , data source n 660-*c*, and a data archive/query engine 640 which is connected to a data archive 650. In this architecture, the data archive/query engine 640 can be implemented in accordance with the exemplary system diagram as depicted in FIG. 4(*a*). The data archive/query engine 640 is capable of processing data based on the information representation of such data constructed in accordance with the information model as described herein.

The network 620 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 620-*a*, . . . , 620-*b*, through which a data source may connect to the network in order to transmit information via the network.

Users 610 may be of different types such as users connected to the network via desktop connections (610-*d*), users connecting to the network via wireless connections such as through a laptop (610-*c*), a handheld device (610-*a*), or a built-in device in a motor vehicle (610-*b*). The data archive/query engine 640 may receive input data from the content sources 660. Upon receiving such input data, the data archive/query engine 640 may generate an information representation of the input data in accordance with the information model disclosed herein and archive the input data accordingly. The data archive/query engine 640 may stand alone or connect to the search engine 630 to assist the search engine on handling search requests. For example, when the search engine 630 receives a request, it may direct the request to the data archive/query engine 640 to obtain a search result. For example, a user may send a query to the search engine 630 via the network 620 and the search engine 630 forwards the request to the data archive/query engine 640. When the data archive/query engine 640 obtains a search result, it forwards the result to the search engine 630, which subsequently forwards it to the user via the network 620.

In addition to a user at 610, a different type of user such as 670, which can be a system operator or an administrator, may also be able to interact with the data archive/query engine 640 for different queries related to data management, processing, and synchronization, etc. In some embodiments, user 670 may be classified to have a higher privilege to receive more operational data than user 610. For example, user 670 may be configured to be able to remotely configure the data archive/query engine on its operation parameters such as the information model configuration. In some embodiments, the data archive/query engine 640 may be a third party service provider so that the search engine 630 and user 670 may be customers of the data archive/query engine 640. In this case, each user (search engine operator or user 670) may configure separate data/process parameters so that the service to different customers may be based on different data/process parameter configurations so that services may be individualized.

FIG. 6(*b*) presents a similarly system configuration as what is shown in FIG. 6(*a*) except that the data archive/query engine 640 is now configured as a backend system of the search engine 630. In this configuration, user 670 may become a customer of the search engine 630 which may subscribe to specific data provenance management services which may be independent of or in addition to the search engine related services. FIG. 6(*c*) presents yet another different system configuration in which the data archive/query engine 640 may be deployed. In this embodiment, the user 670 is a backend operator of the search engine 630 and can interact with the data archive/query engine 640 via an internal or proprietary network connection (not shown). It is noted that different configurations as illustrated in FIGS. 6(*a*)-6(*c*) can also be mixed in any manner that is appropriate for a particular application scenario.

It is understood that, although exemplary embodiments are described herein, they are by ways of example rather than limitation. Any other appropriate and reasonable approached used to implement specific steps of the present teaching can be employed to perform data archiving/search/query based on information modeling as disclosed herein and they will be all within the scope of the present teaching.

In some embodiments, another possible application of the information representation is tagging. In a tagging application, keyword tags for a document can be identified by taking the KL divergence between the information model of the document and the corpus model using, e.g., top N words. The N words may be determined as the ones that occur in the document at a rate higher than expected.

To implement the present teaching, computer hardware platforms may be used as the hardware platform(s) for one or more of the elements described herein (e.g., the information representation generators 402 and 406, the information model based indexing unit 412, the information model based data archive and retrieval units 410 and 414, feature-specific processing unit 510, and the information allocation determiner 515). The hardware elements, operating systems and programming languages of such computers are conventional in nature, and it is presumed that those skilled in the art are adequately familiar therewith to adapt those technologies to implement the information model based processing essentially as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 7:
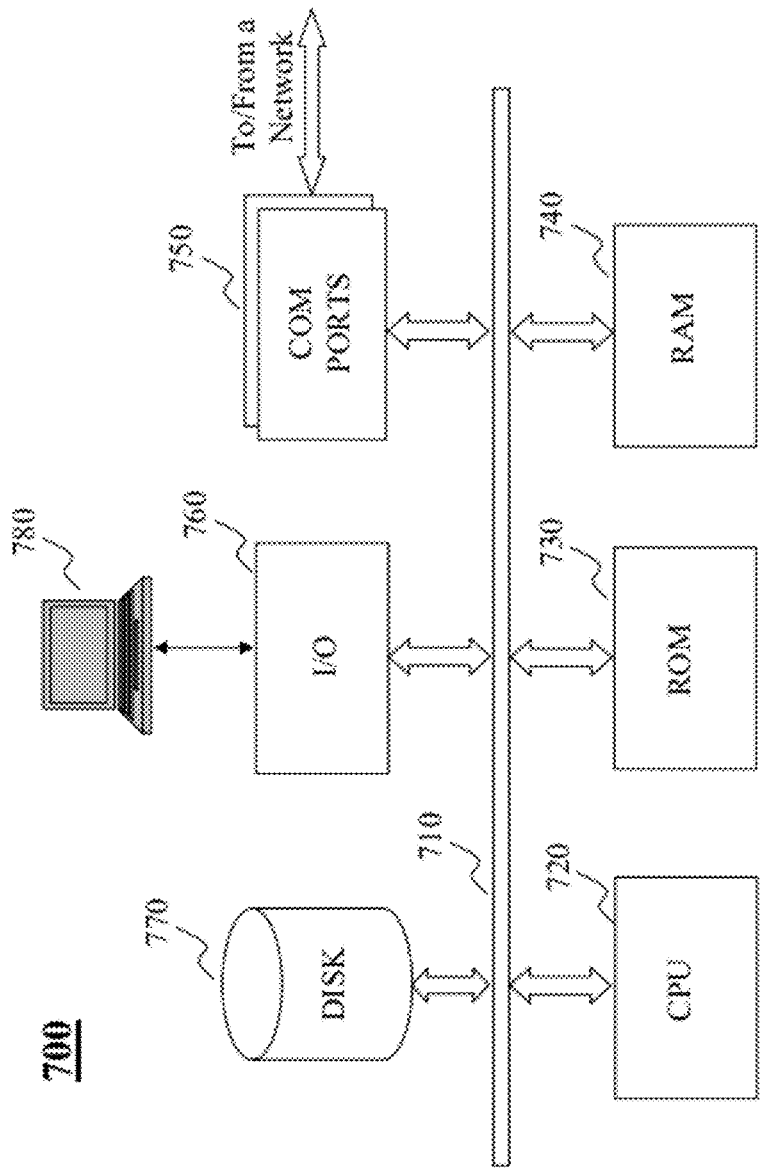
FIG. 7 depicts a general computer architecture on which the present teaching can be implemented.

FIG. 7 depicts a general computer architecture on which the present teaching can be implemented and has a functional block diagram illustration of a computer hardware platform which includes user interface elements. The computer may be a general purpose computer or a special purpose computer. This computer 700 can be used to implement any components of the data archive/search/query architectures as described in FIGS. 6(a)-6(c). Different components of the data archive/search/query architectures, e.g., as depicted in FIGS. 6(a)-6(c) and FIG. 4(a), can all be implemented on a computer such as computer 700, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 700, for example, includes COM ports 750 connected to and from a network connected thereto to facilitate data communications. The computer 700 also includes a central processing unit (CPU) 720, in the form of one or more processors, for executing program instructions. The exemplary computer platform includes an internal communication bus 710, program storage and data storage of different forms, e.g., disk 770, read only memory (ROM) 730, or random access memory (RAM) 740, for various data files to be processed and/or communicated by the computer, as well as possibly program instructions to be executed by the CPU. The computer 700 also includes an I/O component 760, supporting input/output flows between the computer and other components therein such as user interface elements 780. The computer 700 may also receive programming and data via network communications.

Hence, aspects of the method of managing heterogeneous data/metadata/processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, implemented on a machine having at least one processor, storage, and a communication platform connected to a network for constructing an information model to be used to represent data, comprising the steps of:
    determining a plurality of feature sets appropriate for the data, wherein different feature sets correspond to heterogeneous types of features to be used to characterize the data;
    determining, with respect to the data, one or more features for each of the plurality of feature sets;
    specifying a plurality of information allocation models;
    associating an information allocation model with each of the features from each of the feature sets, where the information allocation model associated with the feature is to be used to allocate a portion of information contained in the data to the feature; and
    storing an information model comprising the plurality of feature sets in conjunction with a configuration associating the information allocation models to the features of the plurality of feature sets,
    wherein
        the plurality of feature sets is determined based on a language model established based on a corpus,
        each of the feature sets corresponds to one of the heterogeneous types of features and characterizes the data in terms of one aspect of the data, and
        the total amount of information allocated to the features equals a total amount of information contained in the data.

2. The method of claim 1, wherein the data corresponds to one or more documents.

3. The method of claim 2, wherein the plurality of feature sets includes at least one of uni-gram, bi-gram, topic, and document style.

4. A method, implemented on a machine having at least one processor, storage, and a communication platform connected to a network for archiving data based on an information model, comprising the steps of:
    obtaining data via the communication platform;
    accessing an information model comprising a plurality of heterogeneous types of features, one or more information allocation models, in conjunction with a configuration associating the information allocation models to the features, wherein
        the plurality of heterogeneous types of features is determined based on a language model established based on a corpus, and
        each type of features corresponds to one of the heterogeneous types of features and characterizes the data in terms of one aspect of the data;
    processing, by a feature-specific processing unit, the data with respect to the features;
    allocating, by an information allocation determiner based on the information allocation models, a portion of information that the data contains to each of the features based on the processed data, where the total amount of information allocated to the features equals a total amount of information contained in the data;
    constructing, by an information representation constructor, an information representation of the data based on the allocated information amount to each feature; and
    archiving, by a data archiving unit, the data based on the information representation of the data.

5. The method of claim 4, further comprising:
    generating an index for the archived data based on the information representation of the data; and
    storing the index of the data for future access of the archived data.

6. A method, implemented on a machine having at least one processor, storage, and a communication platform connected to a network for information search and retrieval based on an information model, comprising the steps of:
    obtaining a query via the communication platform;
    accessing, based on the query, an information model comprising a plurality of heterogeneous types of features, one or more information allocation models, in conjunction with a configuration associating the information allocation models to the features, wherein
        the plurality of heterogeneous types of features is determined based on a language model established based on a corpus, and
        each type of features corresponds to one of the heterogeneous types of features and characterizes the data in terms of one aspect of the data;
    processing, by a feature-specific processing unit, the query with respect to the features;
    allocating, by an information allocation determiner, a portion of information that the query contains to each of the features based on the processed data, where the total amount of information allocated to the features equals a total amount of information contained in the query;
    constructing, by an information representation constructor, an information representation of the query based on the allocated information amount to each feature;
    accessing, by a data retrieval unit, an archive to search for similar archived data based on the information representation of the query;
    selecting, by a query response generator, a query response from the similar archived data; and
    returning the query response as a response to the query.

7. The method of claim 6, wherein the step of searching for similar data comprises:
    building an index of the query based on the information representation of the query;
    sending the index of the query to an data archiving indexing mechanism for accessing archived data that have similar index values; and
    receiving, from an information representation based data archive, the similar archived data obtained based on the index of the query.

8. The method of claim 6, further comprising archiving data prior to receiving the query, wherein the step of archiving data comprises:
    obtaining data via a communication platform;
    accessing, based on the data, an information model comprising a plurality of heterogeneous types of features, one or more information allocation models, in conjunction with a configuration associating the information allocation models to the features, wherein each type of features corresponds to one of the heterogeneous types of features to be used to characterize the data;
    processing the data with respect to the features;
    allocating, based on the information allocation models, a portion of information that the data contains to each of the features based on the processed data, where the total amount of information allocated to the features equals a total amount of information contained in the data;
    constructing an information representation of the data based on the allocated information amount to each feature; and archiving the data based on the information representation of the data.

9. A machine-readable tangible and non-transitory medium, having information stored thereon for constructing an information model to be used to represent data, wherein the information, when read by the machine, causes the machine to perform the following:
  providing a plurality of feature sets appropriate for the data, wherein different feature sets correspond to heterogeneous types of features to be used to characterize the data;
  providing, with respect to the data, one or more features for each of the plurality of feature sets;
  determining one or more information allocation models;
  associating an information allocation model with each feature where the information allocation model associated with the feature is to be used to allocate a portion of information contained in the data to the feature; and
  storing an information model comprising the plurality of feature sets in conjunction with a configuration associating the information allocation models to the features of the plurality of feature sets,
  wherein
    the plurality of feature sets is determined based on a language model established based on a corpus,
    each of the feature sets corresponds to one of the heterogeneous types of features and characterizes the data in terms of one aspect of the data, and
    the total amount of information allocated to the features equals a total amount of information contained in the data.

10. The medium of claim 9, wherein the data corresponds to one or more documents.

11. The medium of claim 10, wherein the plurality of feature sets includes at least one of uni-gram, bi-gram, topic, and document style.

12. A machine-readable tangible and non-transitory medium having information recorded thereon for archiving data based on an information model, wherein the information, when read by the machine, causes the machine to perform the following:
  obtaining data via a communication platform;
  accessing an information model comprising a plurality of heterogeneous types of features, one or more information allocation models, in conjunction with a configuration associating the information allocation models to the features, wherein
    the plurality of heterogeneous types of features is determined based on a language model established based on a corpus, and
    each type of features corresponds to one of the heterogeneous types of features and characterizes the data in terms of one aspect of the data;
  processing the data with respect to the features;
  allocating, based on the information allocation models, a portion of information that the data contains to each of the features based on the processed data, where the total amount of information allocated to the features equals a total amount of information contained in the data;
  constructing an information representation of the data based on the allocated information amount to each feature; and
  archiving the data based on the information representation of the data.

13. The medium of claim 12, wherein the information, when read by the machine, further causes the machine to perform:
  generating an index for the archived data based on the information representation of the data; and
  storing the index of the data for future access of the archived data.

14. A machine-readable tangible and non-transitory medium having information for information search and retrieval based on an information model, wherein the information, when read by the machine, causes the machine to perform the following:
  obtaining a query via a communication platform;
  accessing, based on the query, an information model comprising a plurality of heterogeneous types of features, one or more information allocation models, in conjunction with a configuration associating the information allocation models to the features, wherein
    the plurality of heterogeneous types of features is determined based on a language model established based on a corpus, and
    each type of features corresponds to one of the heterogeneous types of features and characterizes the data in terms of one aspect of the data;
  processing the query with respect to the features;
  allocating a portion of information that the query contains to each of the features based on the processed data, where the total amount of information allocated to the features equals a total amount of information contained in the data;
  constructing an information representation of the query based on the allocated information amount to each feature;
  accessing an archive to search for similar archived data based on the information representation of the query;
  selecting a query response from the similar archived data; and
  returning the query response as a response to the query.

15. The medium of claim 14, wherein the step of searching for similar data comprises:
  building an index of the query based on the information representation of the query;
  sending the index of the query to an data archiving indexing mechanism for accessing archived data that have similar index values; and
  receiving, from an information representation based data archive, the similar archived data obtained based on the index of the query.

16. The medium of claim 14, further comprising archiving data prior to receiving the query, wherein the step of archiving data comprises:
  obtaining data via a communication platform;
  accessing, based on the data, an information model comprising a plurality of heterogeneous types of features, one or more information allocation models, in conjunction with a configuration associating the information allocation models to the features, wherein each type of features corresponds to one of the heterogeneous types of features to be used to characterize the data;
  processing the data with respect to the features;
  allocating, based on the information allocation models, a portion of information that the data contains to each of the features based on the processed data, wherein the total amount of information allocated to the features equals a total amount of information contained in the data;
  constructing an information representation of the data based on the allocated information amount to each feature; and archiving the data based on the information representation of the data.

17. An information model stored on a machine-readable non-transitory medium to be used on a machine having at least one processor, storage, and a communication platform connected to a network for representing data, comprising:
   a plurality of heterogeneous types of features, wherein
      the plurality of heterogeneous types of features is determined based on a language model established based on a corpus, and
      each type of features corresponds to one of the heterogeneous types of features and characterizes the data in terms of one aspect of the data;
   one or more information allocation models; and
   a configuration associating an information allocation model with each of the features, where an information allocation model is to be used to allocate a portion of information contained in the data to each of the features, wherein
      the total amount of information allocated to the features equals a total amount of information contained in the data,
      the data is obtained via the communication platform, processed with respect to the features, and archived based on an information representation of the data, and
      the information representation of the data is constructed based on the allocated information amount to each feature.

18. The information model of claim 17, wherein the data corresponds to one or more documents.

19. The information model of claim 18, wherein the plurality of heterogeneous types of features includes at least one of uni-gram, bi-gram, topic, and document style.

20. A system having at least one processor, storage, and a communication platform for archiving data based on an information model, comprising:
   a communication platform through which data is obtained;
   an information model accessing unit configured for accessing an information model comprising a plurality of heterogeneous types of features, one or more information allocation models, in conjunction with a configuration associating the information allocation models to the features, wherein
      the plurality of heterogeneous types of features is determined based on a language model established based on a corpus, and
      each type of features corresponds to one of the heterogeneous types of features and characterizes the data in terms of one aspect of the data;
   a feature-specific processing unit configured for processing the data with respect to the features;
   an information allocation determiner configured for allocating a portion of information that the data contains to each of the features based on the processed data, where the total amount of information allocated to the features equals a total amount of information contained in the data;
   an information representation constructor configured for constructing an information representation of the data based on the allocated information amount to each feature; and
   a data archiving unit configured for archiving the data based on the information representation of the data.

21. The system of claim 20, further comprising:
   an information model based indexing unit configured for generating an index for the archived data based on the information representation of the data, storing the index of the data for future access of the archived data, and facilitating index-based data retrieval.

22. A system having at least one processor, storage, and a communication platform for information search and retrieval based on an information model, comprising:
   a communication platform configured for obtaining a query;
   an information model accessing unit configured for accessing an information model comprising a plurality of heterogeneous types of features, one or more information allocation models, in conjunction with a configuration associating the information allocation models to the features, wherein
      the plurality of heterogeneous types of features is determined based on a language model established based on a corpus, and
      each type of features corresponds to one of the heterogeneous types of features and characterizes the data in terms of one aspect of the data;
   a feature-specific processing unit configured for processing the query with respect to the features;
   an information allocation determiner configured for allocating a portion of information that the query contains to each of the features based on the processed data, where the total amount of information allocated to the features equals a total amount of information contained in the data;
   a query information representation generator configured for constructing an information representation of the query based on the allocated information amount to each feature;
   a data retrieval unit configured for accessing an archive and searching for similar archived data based on the information representation of the query;
   a query response generator configured for returning a query response selected from the similar archived data and returning the query response as a response to the query.

23. The system of claim 22, further comprising a data archiving indexing unit configured for:
   building an index of the query based on the information representation of the query; and
   sending the index to an information representation based data archive to search for archived data that have similar index values.

* * * * *